O. H. LEWIS.
SPADE KNIFE.
APPLICATION FILED OCT. 14, 1916.

1,408,368.

Patented Feb. 28, 1922.

Inventor:
Owen H. Lewis

UNITED STATES PATENT OFFICE.

OWEN HERBERT LEWIS, OF HENDRUM, MINNESOTA.

SPADE KNIFE.

1,408,368.  Specification of Letters Patent.  Patented Feb. 28, 1922.

Application filed October 14, 1916. Serial No. 125,538.

*To all whom it may concern:*

Be it known that I, OWEN H. LEWIS, a citizen of the United States, residing at Hendrum, in the county of Norman and State of Minnesota, have invented a new and useful Spade Knife, of which the following is a specification.

This invention has reference to knives and its object is to provide a knife of general use about a kitchen for cutting, slicing, paring, scraping, turning, and various other operations.

The invention comprises a knife-like device having a handle and a long, thin, flexible blade of peculiar shape, with a cutting edge having an extension at the handle end particularly adapted for paring and scraping, while the outer end of the blade is square and relatively blunt, with the blade tapering in thickness toward the outer end to produce great flexibility, and at the same time retain requisite strength. whereby the blade may be used as a cake turner and for other similar purposes.

The invention will be best understood from a consideration of the following detailed description, taken in connection with the accompanying drawing forming part of this specification, with the further understanding that, while the drawing shows a practical form of the invention, the latter is not confined to any strict conformity with the showing of the drawing but may be changed and modified so long as such changes and modifications come within the scope of the appended claims.

In the drawing:—

Figure 1:
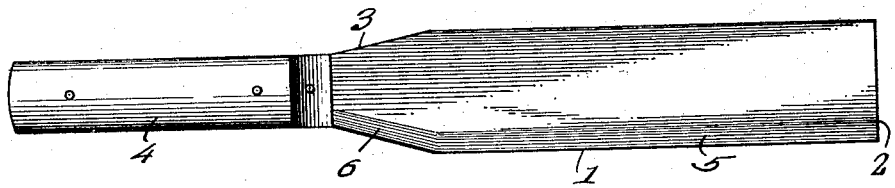
Figure 1 is a plan view of the knife.
Figure 2:
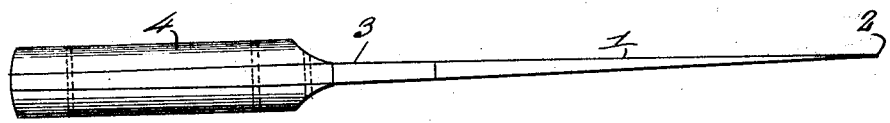
Fig. 2 is an edge view thereof.

Referring to the drawing, there is shown a blade 1 of constant width throughout the greater portion of its length and having a square outer end 2. The blade is provided with a shank portion 3 tapering in width toward a handle 4. The blade has one edge 5 sharpened throughout its length, and this sharpened edge merges into a similarly shaped edge 6 of the shank 3. The blade, including the shank 3, tapers gradually in thickness from the handle 4 to the end 2 where the blade is quite thin but still blunt, that is, the outer end 2 does not constitute a cutting edge like the edges 5 and 6.

The relative thickness of the blade with respect to its length is largely exaggerated in the drawings, since in the actual construction the blade is about $8\frac{1}{4}$ inches beyond the handle, and is $1\frac{1}{2}$ inches wide, while the portion of the blade of even width measures about $6\frac{1}{2}$ inches, with the tapered shank portion about $1\frac{3}{4}$ inches in length. The greatest thickness of the blade, which is where it joins the handle, is about $\frac{1}{16}$ of an inch, while the thickness at the outer end 2 is about that of writing paper, tapering from a thickness of about $\frac{1}{32}$nd of an inch, where the shank merges into the body of the blade.

Because of the difficulty of showing these small dimensions in the drawings, especially those with respect to thickness, the drawings indicate the thickness greatly exaggerated.

While the proportions specified are not obligatory, it is needful for the operation of the device that the body of the blade be thin and flexible, and several times as long as wide, with the outer end square and the sharpened edge extending from the outer end along the full length of the body of the blade and along the tapered shank to a point close to the handle.

The implement is particularly adapted for slicing vegetables, cutting bread, paring and scraping. The implement is useful as a lifting and turning device in frying potatoes, fish, and other kinds of food, and this may be accomplished without dulling the sharpened edge, since the only part which comes in contact with the cooking vessel is the square, outer end, which latter makes the culinary implement particularly adapted for use with griddles and the like.

The thin but blunt outer edge 2 is useful for cleaning pots and pans. The peculiar tapered form of the shank where sharpened has been found in practice to greatly facilitate the paring of vegetables and fruit.

Because of the construction of the implement, it is adapted to a great variety of uses which has heretofore demanded quite a large number of different implements, and for some purposes, the implement is advantageous over other specially devised implements.

What is claimed is:—

A knife comprising an elongated and comparatively thin flexible blade provided with a handle at one end, said blade tapering in thickness from the handle toward the outer end, with the latter of square shape and relatively blunt, said blade having a shank portion tapering in width toward the handle with the body of the blade of constant width throughout, one long edge of the body of the blade and the edge of the taper shank on the same side of the blade being sharpened.

OWEN HERBERT LEWIS.